2,838,407
CERAMIC DIELECTRIC COMPOSITION

William W. Coffeen, Westfield, N. J., assignor to Metal & Thermit Corporation, New York, N. Y., a corporation of New Jersey No Drawing. Application August 5, 1954
Serial No. 448,150

11 Claims. (Cl. 106—46)

This invention relates to ceramic dielectric bodies.

Present commercial capacitors utilizing ceramic bodies with dielectric constants of about 2000 show variations in the dielectric constant of 15% or more of the value at 25° C. in the range from 25° C. to 85° C., and more than 40% of the value at 25° C. in the range from −55° C. to 85° C. The latter range is of special importance for military applications.

It is the primary object of the present invention to produce a ceramic dielectric body of relatively high dielectric constant (of the order of 2000) which shows small variation with change of temperature over the extended range from −55° C. to 85° C., and which has a low dissipation factor, not more than two percent.

I have found that ceramic bodies composed of barium titanate ($BaTiO_3$) 99.5 to 95 mole percent and, as additive, calcium antimonate ($CaSb_2O_6$) and/or calcium fluoantimonate ($Ca_5F_2Sb_4O_{14}$), 0.5 to 5 mole percent, form dielectric bodies which are practically and advantageously operative. The preferred range, however, is 98.5 to 99.5 mole percent barium titanate and 1.5 to .5 mole percent additive consisting of calcium antimonate and/or calcium fluoantimonate. In one aspect of this invention a ceramic dielectric body consisting essentially of 98.5 mole percent barium titanate and 1.5 mole percent of an additive of the group of calcium antimonate and calcium fluoantimonate are particularly suitable.

Calcium fluoantimonate of the formula given above is merely illustrative of many calcium fluoantimonates which may be used with advantage. Any of the compositions referred to in my United States Patent No. 2,558,932 as containing calcium, fluorine and antimony in a united form may be similarly used.

Dielectric bodies in the preferred range, having dielectric constants of about 2000, show as little as 3% variation of the dielectric constant at 25° C. in the range from 25° C. to 85° C., and as little as 8% variation of the dielectric constant at 25° C. in the range from −55° C. to 85° C. The dissipation factors of these bodies are, moreover, well below the dissipation factors of typical commercial capacitors now in use, being not more than two percent and generally under one percent.

Antimonates of sodium, potassium, lithium, barium, strontium, lead, zinc, bismuth, aluminum, tin and titanium act similarly to antimonates and fluoantimonates of calcium, and may be used in the same range of proportions with similar effects, but these additives are not the full equivalents of calcium antimonate and calcium fluoantimonate.

Alternatively, various cations of antimony, sodium, potassium, lithium, barium, strontium, lead, zinc, bismuth, aluminum, tin and titanium may be used as additives separately or in combination in the same range of proportions specified above, but these additives also fall short of the results obtained from calcium antimonate and calcium fluoantimonate.

The named primary additives to barium titanate can, within the scope of the invention, be used in conjunction with supplemental additives such as stannates of barium, calcium, strontium, magnesium, lead, bismuth and/or nickel, and/or zirconates of barium, calcium, strontium, magnesium and/or lead, and/or titanates of calcium, magnesium, strontium and/or lead.

When the secondary additives are employed, they are used in lieu of a portion of the primary additive, the total additive, both primary and secondary constituting .5 mole percent to 5 mole percent of the total body composition and the supplemental additive constituting not more than 15 mole percent of the total additive.

For illustrative purposes the manufacture of dielectric bodies of two compositions within the scope of the invention, and designated respectively as A and B, are set forth below.

The body compositions were prepared as follows:

|  | Mole Percent | | Weight Percent | | Batch Weights | |
|---|---|---|---|---|---|---|
|  | A | B | A | B | A | B |
| $BaTiO_3$ | 99 | 99 | 98.0 | 98.4 | 19.60 | 19.68 |
| $CaSb_2O_6$ |  | 1 |  | 1.6 |  | 0.32 |
| $Ca_5F_2Sb_4O_{14}$ | 1 |  | 2.0 |  | 0.40 |  |

The twenty gram batches as shown were weighed and slurried in 50 cc. distilled water. Each slurry was dried, ground to pass a 50 mesh screen, moistened with about 5% to a 2½% starch solution and pressed into a slug for calcining. After calcining 1 hour at 1800° F. the calcine was ground to pass 325 mesh, again moistened with starch solution and pressed into small discs, ⅜″ diameter and about 0.1″ thick. The discs were fired on platinum foil at 2600° F. for 1 hour, and after this treatment were found to have zero absorption. Silver paint was brushed on both faces of each disc, followed by firing at 1350° F. for one hour. Tinned copper leads were attached by soldering directly to the fired electrodes. After aging for at least one week, measurements of capacitance and dissipation factor were made at a frequency of one kc. and over a temperature range from −55° C. to 85° C. Results were as follows, #514 indicating the experiment employing composition A and #519 indicating the experiment employing composition B:

|  | 25° C. | | Temp. Variation of K in Percent of K at 25° C. | |
|---|---|---|---|---|
|  | K | D. F. | 25° to 85° C. | −55° to 85° C. |
|  |  |  | Percent | Percent |
| #514 | 1,940 | .0043 | 5 | 17 |
| #519 | 2,000 | .0047 | 7 | 8 |

I have described what I believe to be the best embodiments of my invention. I do not wish, however, to be confined to the embodiments shown, but what I desire to cover by Letters Patent is set forth in the appended claims.

I claim:

1. A ceramic dielectric body consisting essentially of 99.5 to 95 mole percent barium titanate and .5 to 5 mole percent of an additive chosen from the group consisting of calcium antimonate, a calcium fluoantimonate and mixtures thereof.

2. A ceramic dielectric body consisting essentially of 98.5 mole percent barium titanate and 1.5 mole percent of an additive chosen from the group consisting of calcium antimonate, a calcium fluoantimonate and mixtures thereof.

3. A ceramic dielectric body having a dielectric constant of the order of 2000, whose dielectric constant does not vary more than 17% of its value at 25° C. throughout the range from −55° C. to 85° C., and whose dissipation factor is not greater than .0200, said body consisting essentially of 99.5 to 95 mole percent barium titanate and .5 to 5 mole percent of an additive chosen from the group consisting of calcium antimonate, a calcium fluoantimonate and mixtures thereof.

4. A ceramic dielectric body having a dielectric constant of the order of 2000, whose dielectric constant does not vary more than 17% of its value at 25° C. throughout the range from −55° C. to 85° C., and whose dissipation factor is not greater than .0200, said body consisting essentially of 98.5 mole percent barium titanate and 1.5 mole percent of an additive chosen from the group consisting of calcium antimonate, a calcium fluoantimonate and mixtures thereof.

5. A ceramic composition consisting essentially of 98.5 to 99.5 mole percent of barium titanate and 1.5 to .5 mole percent of an additive selected from the group consisting of calcium antimonate, calcium fluoantimonates and mixtures thereof.

6. A ceramic dielectric composition consisting essentially of 99.5 to 95 mole percent of barium titanate and .5 mole to 5 mole percent of a primary additive chosen from the group consisting of calcium antimonate, calcium fluoantimonates and mixtures thereof.

7. A composition according to claim 6 including a secondary additive selected from the class consisting of barium stannate, calcium stannate, strontium stannate, magnesium stannate, lead stannate, bismuth stannate, nickel stannate, barium zirconate, calcium zirconate, strontium zirconate, magnesium zirconate, lead zirconate, calcium titanate, magnesium titanate, strontium titanate and lead titanate said primary and secondary additive constituting .5 mole percent to 5 mole percent of the total dielectric composition and said secondary additive constituting not more than 15 mole percent of the total additive.

8. A ceramic dielectric body having a dielectric constant of about 2000 and a dissipation factor not greater than .0200, said body consisting essentially of 99 mole percent of barium titanate and 1 mole percent of calcium antimonate.

9. A ceramic dielectric body having a dielectric constant of about 2000 and a dissipation factor not greater than .0200, said body consisting essentially of 99 mole percent of barium titanate and 1 mole percent of a calcium fluoantimonate.

10. A ceramic dielectric body consisting essentially of 99 mole percent of barium titanate and 1 mole percent of calcium fluoantimonate, said dielectric body having a dielectric constant of about 1940 at 25° C., and a dissipation factor of .0043 at 25° C., and whose dielectric constant does not vary more than 5% of its value at 25° C., through the temperature range of 25° C. to 85° C., and not more than 17% of its value at 25° C., throughout the temperature range of −55° C. to 85° C.

11. A ceramic dielectric body consisting essentially of 99 mole percent of barium titanate and 1 mole percent of calcium antimonate, said dielectric body having a dielectric constant of about 2000 at 25° C., and a dissipation factor of .0047 at 25° C., and whose dielectric constant does not vary more than 7% of its value at 25° C., throughout the temperature range of 25° C. to 85° C., and not more than 8% of the value at 25° C., throughout the temperature range of −55° C. to 85° C.

References Cited in the file of this patent
UNITED STATES PATENTS
2,529,719     Wentworth  _____ Nov. 14, 1950